United States Patent
Ogasawara

Patent Number: 5,088,679
Date of Patent: Feb. 18, 1992

[54] MIRROR CASE POSITIONING DEVICE FOR DOOR MIRROR OF AUTOMOBILE

[75] Inventor: Morihiko Ogasawara, Aichi, Japan

[73] Assignee: Kabushiki Kaisha Tokai Rika Denki Seisakusho, Aichi, Japan

[21] Appl. No.: 671,952

[22] Filed: Mar. 19, 1991

[30] Foreign Application Priority Data

Mar. 19, 1990 [JP] Japan .................. 2-69219

[51] Int. Cl.$^5$ ............................................... G02B 7/18
[52] U.S. Cl. .................................... 248/479; 248/549; 248/900
[58] Field of Search ............... 248/479, 487, 486, 484, 248/900, 475.1, 549; 350/635, 604, 632

[56] References Cited

U.S. PATENT DOCUMENTS

| | | | |
|---|---|---|---|
| 4,186,905 | 2/1980 | Bradly | 248/478 |
| 4,660,944 | 4/1987 | Suzuki et al. | 248/487 X |
| 4,982,926 | 1/1991 | Mori | 248/479 |
| 5,005,797 | 4/1991 | Mackawa et al. | 248/900 X |

*Primary Examiner*—Alvin C. Chin-Shue

[57] ABSTRACT

A mirror case positioning device for holding the mirror case at least in a normal position, on one hand, and permitting the mirror case to lightly rotate between the normal position and a rest position. A first friction plate is secured on a lower face of a flange of a bracket for supporting the mirror case. A second friction plate as a resonance body is secured on an upper face of a flange of a column mounted on a support. A vibration element is mounted on the upper face of the flange of the column so as to cooperate with the second friction plate. The vibration element is operated by a supersonic generator. When the supersonic generator is not operated, the first and second friction plates contact frictionally with each other so that the mirror case is held at a desired position including the normal position. On the contrary, when the supersonic generator is operated, the second friction plate is considerably vibrated so that the fiction between both friction plates are reduced, resulting in a light rotation of the mirror case.

6 Claims, 1 Drawing Sheet

MIRROR CASE POSITIONING DEVICE FOR DOOR MIRROR OF AUTOMOBILE

BACKGROUND OF THE INVENTION

1. Field of the Invention

The present invention generally relates to a door mirror for use in an automobile. It particularly relates to a mirror case positioning device for positioning the mirror case at a normal position or visible position with respect to a support for rotatably supporting the mirror case and for permitting the mirror case to rotate toward a rest position or unused position when desired.

2. Description of the Related Art

Typically, the mirror case positioning device includes some projections which are arranged on a first face of the support, and the corresponding recesses which are arranged on a second face of the mirror case confronting the first face of the support. When the mirror case is located on the normal position so that the driver can see the face of mirror, the projections are engaged in the recesses to fix the normal position. Meanwhile, when the mirror case is desired to be moved from the normal position to the rest position, the engagement of the projections and the recesses are forcibly released. Specifically, the engagement of the projections and the recesses are effected by means of a spring. Therefore, the force required for their disengagement is quite large, so that the motor for driving the mirror case becomes large in size and accordingly the speed reduction mechanism for reducing the high power output of the motor becomes also becomes large in size. Therefore, the drive mechanism for the mirror case results in occupying a large space in the door mirror. In addition, when the projections engage and disengage with the recesses, a noise is disadvantageously generated.

In order to solve the above-mentioned disadvantages, another mechanism for positioning the mirror case must be provided instead of the conventional one.

SUMMARY OF THE INVENTION

Accordingly, an essential object of the present invention is to provide an improved mirror case positioning device including a friction system instead of the engaging system of the projections and the recesses, in which the mirror case can be fixed on the normal position due to the friction between the confronting faces of the mirror case and the support, while the mirror case can be easily rotated from the normal position to the rest position with the friction reduced.

In accomplishing this and other objects, according to the present invention, there is provided a door mirror for use in an automobile comprising support means to be secured on a door of the automobile, mirror case means rotatably mounted on the support means, and positioning means which includes first means arranged on one of the support means and the mirror case means and second means arranged on the other of the support means and the mirror case means. The first and second means cooperates with each other such that they, on one hand, hold the mirror case means at least on a normal position and, on the other hand, permit the mirror case means to rotate between the normal position and a rest position.

The first means comprises a first friction member having a friction face.

The second means comprises a second friction member having a friction face to be in contact with the friction face of the first friction member, and a vibration element cooperating with the second friction member and adapted to be connected with a supersonic generator.

With the above-described construction, when the supersonic generator is not operated, the first and second friction members contact frictionally with each other so that the mirror case is held at a desired position including the normal position. On the contrary, when the supersonic generator is operated, the second friction member is considerably vibrated so that the friction between both friction members are reduced, resulting in a light rotation of the mirror case.

BRIEF DESCRIPTION OF THE DRAWINGS

This and other objects and features of the present invention will become apparent from the following description taken in conjunction with the preferred embodiment thereof with reference to the accompanying drawing, in which.

DETAILED DESCRIPTION OF THE INVENTION

Figure 1:
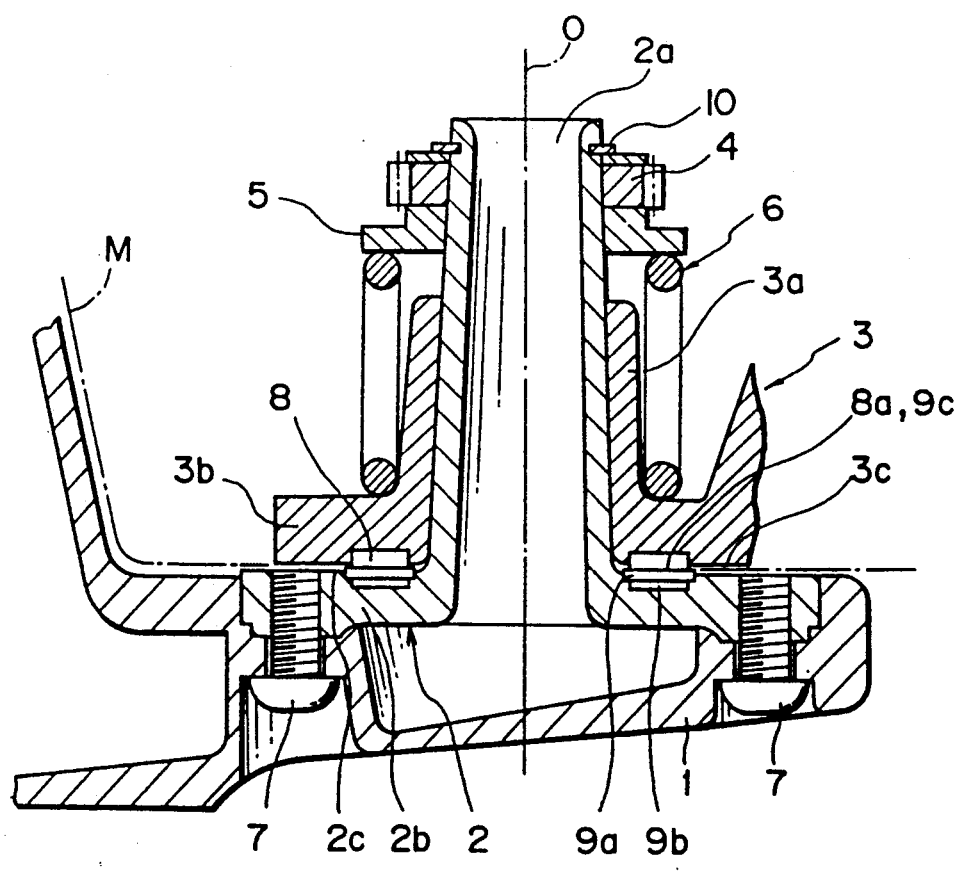
FIGURE 1 is a sectional view of an essential part of the door mirror for use in an automobile according to an embodiment of the present invention.

Referring to FIGURE. 1, a support or stay 1 is secured on a door of an automobile (not shown). A column 2 as a rotation axis is secured on the support 1. The column 2 includes a sleeve 2a and a flange 2b extending radially outwardly from the lower end of the sleeve 2a and secured on the upper face of the support 1 by means of the screws 7.

A mirror case M accommodating a driving unit, a mirror and the like is supported on the support 1 by means of a bracket 3 which is accommodated in and fixed on the mirror case M. The bracket 3 has a sleeve 3a which is fitted over the sleeve 2a of the column 2. The bracket 3 has a flange 3b which extends radially and outwardly from the lower end of the sleeve 3a so as to confront the flange 2b of the column 2. Therefore, the bracket 3 and accordingly the mirror case M is rotatable with respect to the column 2 and the support 1 around the center axis or rotation axis 0 of the sleeve 2a.

A helical spring 6 is arranged around the sleeve 3a of the bracket 3. Further, a spring seat 5, a gear 4 and stopper ring 10 are fitted over the top portion of the sleeve 2a above the spring 6.

The upper end of the spring 6 is in contact with the lower face of the seat 5, while the lower end of the spring 6 is in contact with the upper face of the flange 3b of the bracket 3, so that the bracket 3 is urged downwardly by the spring 6 toward the flange 2b of the column 2.

The gear 4 is fixed on the outer periphery of the sleeve 2a and is meshed with a gear included in a reduction mechanism (not shown) to be drivingly connected with an electric motor (not shown).

When the motor is driven, the bracket 3 is rotated along with the mirror case M around the axis 0 since the gear 4 is not rotatable with respect to the column 2.

A mirror case positioning device is arranged between a lower face 3c of the flange 3b of the bracket 3 and an upper face 2c of the flange 2b of the column 2. The device includes a first annular friction plate 8 which is mounted on the lower face 3c and the center of which corresponds to the axis 0, and a second annular friction plate 9a which is mounted on the upper face 2c of the flange 2 and the center of which also corresponds to the axis 0. The second plate 9a constitutes a resonance body which is to be vibrated by a vibration element 9b which is mounted on the lower face of the second plate 9a and is an annular plate like element.

The vibration element 9b is connected to a supersonic generator (not shown). The element 9b and the generator constitutes a supersonic vibration apparatus. Therefore, when the element 9b is vibrated by the generator, the second plate 9a as a resonance body is considerably vibrated.

With the above arrangement according to one preferred embodiment of the present invention, when the supersonic vibration apparatus is not operated, the first friction plate 8 is depressed onto the second friction plate 9a by means of the helical spring 6 so that the friction between the lower face 8c of the plate 8 and the upper face 9c of the plate 9a is large enough to hold the mirror case M on a desired position including the normal position with respect to the support 1.

On the other hand, when the supersonic vibration apparatus is operated and the second plate 9a is largely vibrated, the friction between both plates 8 and 9a are considerably reduced. In this condition, the mirror case M with the bracket 3 can be easily rotated by the driving means. Namely, the torque for driving the mirror case M can be minimized, resulting in the miniaturization of the driving means.

Alternatively, an electric motor and its transmission mechanism or reduction mechanism according the above-described embodiment may be replaced by a supersonic motor and its transmission mechanism. In this case, the generator associating with the vibration element 9b may be commonly used for the means for operating the supersonic motor.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A door mirror for use in an automobile comprising:
   support means to be secured on a door of the automobile,
   mirror case means rotatably mounted on the support means, and
   positioning means which includes a first means arranged on one of the support means and the mirror case means and a second means arranged on the other of the support means and the mirror case means, the first and second means cooperating with each other such that they, on one hand, hold the mirror case means at least in a normal position and, on the other hand, permit the mirror case means to rotate between the normal position and a rest position,
   the first means comprising a first friction member having a friction face,
   the second means comprising a second friction member having a friction face to be in contact with the friction face of the first friction member, and a vibration element cooperating with the second friction member and connected to a supersonic generator.

2. The door mirror according to claim 1, wherein the second friction member constitutes a resonance body for the vibration element.

3. A door mirror for use in an automobile comprising:
   a support to be secured on a door of the automobile,
   a column fixedly supported on the support which includes a first sleeve and first flange extending radially outwardly from a lower end of the first sleeve,
   a mirror case rotatably mounted on the support means by means of a bracket which is accommodated by the mirror case and includes a second sleeve fitted over the first sleeve and a second flange extending radially outwardly from a lower end of the second sleeve having a lower face confronting an upper face of the first flange,
   positioning means which includes a first means arranged on one of the upper face of the first flange and the lower face of the second flange and a second means arranged on the other of the faces, the first and second means cooperating with each other such that they, on one hand, hold the mirror case at least in a normal position and, on the other hand, permit the mirror case to rotate between the normal position and a rest position,
   the first means comprising a first friction member having a friction face,
   the second means comprising a second friction member having a friction face to be in contact with the friction face of the first friction member, and a vibration element cooperating with the second friction member and connected to a supersonic generator.

4. The door mirror according to claim 3, wherein the second friction member constitutes a resonance body in operative cooperation with the vibration element.

5. A door mirror for use in an automobile comprising:
   a support to be secured on a door of the automobile,
   a column fixedly supported on the support which includes a first sleeve and first flange extending radially outwardly from a lower end of the first sleeve,
   a mirror case rotatably mounted on the support means by means of a bracket which is accommodated by the mirror case and includes a second sleeve fitted over the first sleeve and a second flange extending radially outwardly from a lower end of the second sleeve having a lower face confronting an upper face of the first flange,
   positioning means which includes a first means arranged on one of the upper face of the first flange and the lower face of the second flange and a second means arranged on the other of the faces, the first and second means cooperating with each other such that they, on one hand, hold the mirror case at least in a normal position and, on the other hand, permit the mirror case to rotate between the normal position and a rest position,
   the first means comprising a first friction member having a friction face,
   the second means comprising a second friction member having a friction face to be in contact with the friction face of the first friction member, and a vibration element cooperating with the second friction member and adapted to be connected with a supersonic generator and the first friction member, the second friction member and the vibration element, are respectively, annular plate-like members and elements for surrounding the first sleeve.

6. The door mirror according to claim 5, wherein the second friction member constitutes a resonance body in operative cooperation with the vibration element.

* * * * *